United States Patent [19]
Na

[11] Patent Number: 5,524,185
[45] Date of Patent: Jun. 4, 1996

[54] WIRELESS COMPUTER SYSTEM WITH SHARED PRINTER

[75] Inventor: Kweon Na, Seoul, Rep. of Korea

[73] Assignee: Hyundai Electronics Industries Co., Kyoungki-Do, Rep. of Korea

[21] Appl. No.: 301,181

[22] Filed: Sep. 6, 1994

[30] Foreign Application Priority Data

Dec. 23, 1993 [KR] Rep. of Korea ................. 1993-29294

[51] Int. Cl.[6] ............................. G06K 15/00; H04Q 7/00
[52] U.S. Cl. ........................................... 395/114; 370/69.1
[58] Field of Search ..................................... 359/154, 118; 395/114, 106; 380/21; 455/31.1; 370/69.1, 95.1

[56] References Cited

U.S. PATENT DOCUMENTS

| | | | |
|---|---|---|---|
| 4,812,842 | 3/1989 | Bayerlein et al. | 340/825.72 |
| 5,247,380 | 9/1993 | Lee et al. | 359/118 |
| 5,255,268 | 10/1993 | Cato et al. | 370/94.1 |
| 5,321,542 | 6/1994 | Freitas et al. | 359/172 |
| 5,325,046 | 6/1994 | Young et al. | 323/356 |
| 5,335,276 | 8/1994 | Thompson et al. | 380/21 |
| 5,337,314 | 8/1994 | Hoff et al. | 370/94.1 |
| 5,371,738 | 12/1994 | Moelard et al. | 370/85.1 |
| 5,386,590 | 1/1995 | Dolan | 455/33.1 |
| 5,410,543 | 4/1995 | Seitz et al. | 370/85.13 |

*Primary Examiner*—Raymond J. Bayerl
*Assistant Examiner*—Steven P. Sax
*Attorney, Agent, or Firm*—Fish & Richardson

[57] ABSTRACT

A wireless common printer system capable of achieving a print operation in accordance with a priority sequence by, at the side of personal computers, differentially encoding data to be printed by use of pseudo noise codes allocated to the computers like intrinsic identifiers and transmitting the data after spreading it in a direct sequence and, at the side of printer, extracting data from those received from the computers by use of a despread spectrum technique utilizing matched filters having individual intrinsic identifier codes. Since the common printer system is the wireless system eliminating requirements of a separate printer switching unit and a printer cable, there is no limitation on the usable distance in so far as electric power of a certain radio frequency is kept. By virtue of this feature, the common printer system provide an enhanced convenience when it is applied to lap top computers and personal note book computers having a high movability.

8 Claims, 5 Drawing Sheets

WIRELESS COMPUTER SYSTEM WITH SHARED PRINTER

BACKGROUND OF THE INVENTION

1. Field of the Invention

The present invention relates to a printer common system for enabling several personal computers to share a single printer, and more particularly to a wireless printer common system for enabling several personal computers to share a single printer by wireless.

2. Description of the Prior Art

Generally, known printer common devices require a printer switching unit and cables corresponding in number to computers to share a printer. As the distance between the printer and a computer connected with each other by a cable is increased, the length of the cable is increased. This increased cable length may result in an error in data transmitted to the side of the printer. For this reason, existing printer switching units have a limitation on usable distance. As a result, computers having a high movability such as lap top computers and personal note book computers encounter a difficulty to use the existing printer common systems.

On the other hand, a wireless control technique for printing machines is disclosed in U.S. Pat. No. 4,812,842 issued on Mar. 14, 1989 and entitled "Device for the Control of Rotary Printing Machines". However, the wireless control device disclosed in the patent requires separate transmitter and receiver because a control signal should be transmitted by use of electromagnetic radiation or ultrasonic waves.

SUMMARY OF THE INVENTION

Therefore, an object of the invention is to provide a wireless common printer system capable of achieving a print operation in accordance with a priority sequence by, at the side of personal computers, differentially encoding data to be printed by use of pseudo noise codes allocated to the computers like intrinsic identifiers and transmitting the data after spreading it in a direct sequence and, at the side of printer, extracting data from those received from the computers by use of a despread spectrum technique utilizing matched filters having individual intrinsic identifier codes.

In accordance with the present invention, this object can be accomplished by providing a wireless printer common system for a enabling several personal computers to share a single printer, comprising: first data transmitting and receiving means provided at each of the computers and adapted to transmit data to be printed to the printer by wireless and receive a signal from the printer by wireless; and second data transmitting and receiving means provided at the printer and adapted to receive signals respectively transmitted from the computers, select one from the received signals in accordance with a priority sequence, print the selected signal, and transmit a standby signal to the remaining computers, whose signals have not been printed yet, so that the remaining computers are at a standby state, whereby all the computers can achieve a code-divided multi-connection with the printer.

The first data transmitting and receiving means comprises: a parallel data input buffer for sending 8-bit parallel data to be printed to a transmitted and received data converting unit; a unistable multi-vibrator for adjusting pulse-width of a strobe signal being activated for several microseconds when the 8-bit parallel data is sent to the transmitted and received data converting unit and sending the pulse-width-adjusted strobe signal to the transmitted and received data converting unit, thereby loading the 8-bit parallel data in the transmitted and received data converting unit; a data output controlling unit for controlling outputting of data to the printer; the transmitted and received data converting unit for converting the 8-bit parallel data received from the parallel data input buffer into serial data, differentially encoding the serial data, differentially decoding a serial data signal transmitted from the printer, and converting the differentially decoded serial data signal into a parallel data signal; and a transmitted and received data processing unit including a transmitter-side baseband processor adapted to generate a pseudo noise code allocated to the corresponding computer when the differentially-encoded signal received from the computer side is transmitted to the printer and band-spread the differentially-encoded signal by use of the generated pseudo noise code, an intermediate frequency/ radio frequency processor adapted to process the signal transmitted from the computer side and the signal received from the printer side, and a receiver-side baseband processor adapted to despread the signal received from the printer side.

The second data transmitting and receiving means comprises: a parallel data output buffer for receiving 8-bit parallel data from the side of each of the computer and sending it to the printer; a first unistable multi-vibrator for receiving a strobe signal transmitted from one of the computers and allowing the printer to be at a print enable state in response to the strobe signal; a second unistable multi-vibrator for adjusting pulsewidth of a busy signal being inactive at the print enable state of the printer, the busy signal being transmitted from the printer; a transmitted and received data converting unit for not only converting the busy signal received from the printer side into a serial data signal and differentially decoding the serial data signal, but also converting the serial data transmitted from the side of the computer into parallel data; a transmitted data controlling unit for controlling data transmitted to the printer side and data received from the printer side to process them in accordance with a priority sequence; and a transmitted and received data processing unit for not only band-spreading the data processed in the transmitted and received data controlling unit and sending it to the computer side, but also despreading the data received from the computer side and sending it to the transmitted and received data controlling unit, the transmitted and received data processing unit including a plurality of transmitter-side baseband processors respectively corresponding to the computers, each of the transmitter-side base band processors being adapted to generate a pseudo noise code allocated to each corresponding computer when the differentially-encoded signal received from the printer side is transmitted to the computer side and band-spread the differentially-encoded signal by use of the generated pseudo noise code, an intermediate frequency/ radio frequency processor adapted to process the signal transmitted from the printer side and the signal received from the computer side, and a plurality of receiver-side baseband processors respectively corresponding to the computers, each of the receiver-side base band processors being adapted to despread the signal received from the computer side.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
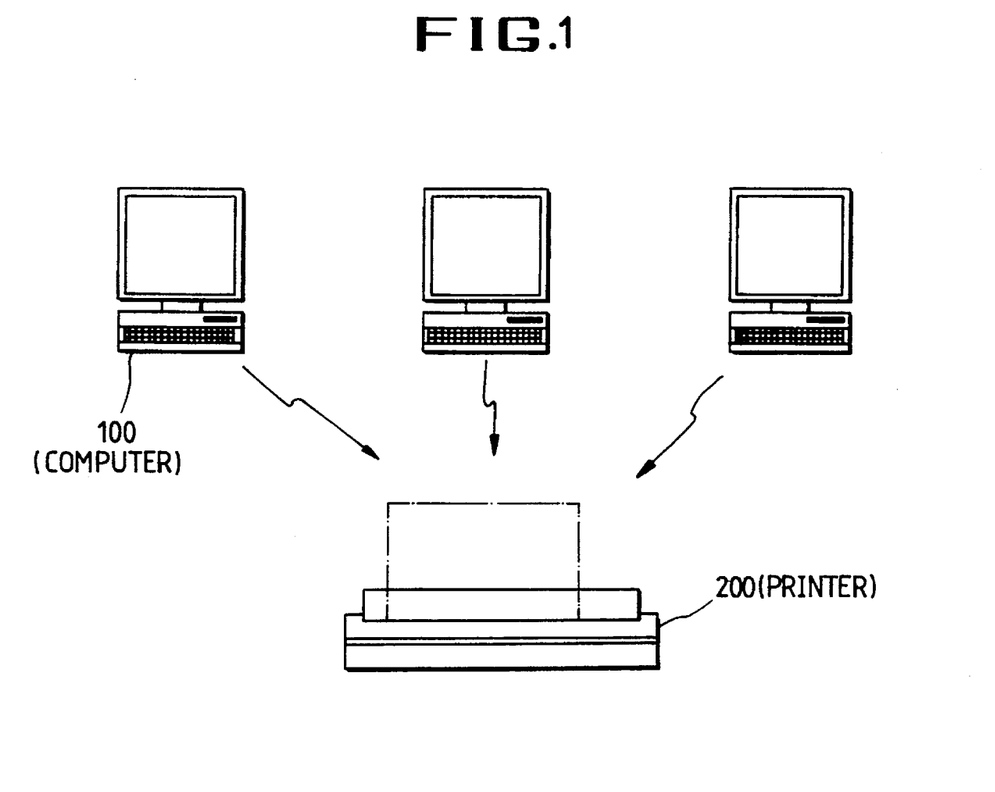
FIG. 1 is a schematic view illustrating a wireless printer common system in accordance with the present invention.

Referring to FIG. 1, there is illustrated several computers which is to share a single printer by a wireless printer common system in accordance with the present invention. In FIG. 1, the computers are denoted by the reference numeral 100 whereas the printer is denoted by the reference numeral 200.

Figure 2:
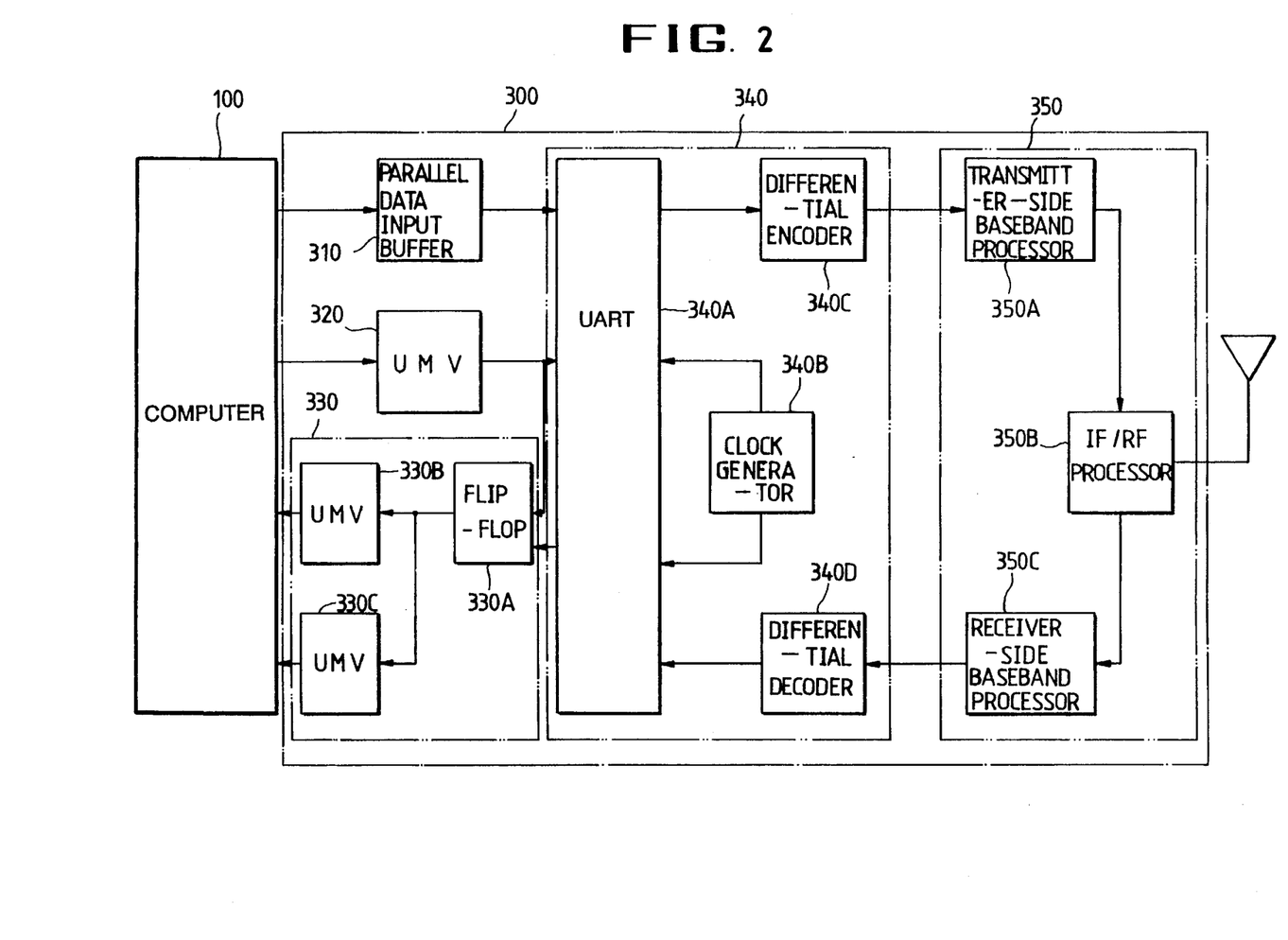
FIG. 2 is a block diagram illustrating a computer-side data receiver and transmitter unit constituting a part of the wireless printer common system in accordance with the present invention.

FIG. 2 is a block diagram illustrating a data receiver and transmitter unit constituting a part of the wireless printer common system in accordance with the present invention. This data receiver and transmitter unit is adapted to be installed in each of the computers 100 and denoted by the reference numeral 300. As shown in FIG. 2, the data receiver and transmitter unit 300 adapted to be mounted at the computer side includes a parallel data input buffer 310 for sending 8-bit parallel data to be printed to a universal asynchronous receiver and transmitter (UART) 340A of a transmitted and received data converting unit 340, a unistable multi-vibrator 320 for adjusting the pulsewidth of a strobe signal being activated for several microseconds when the 8-bit parallel data is sent to the UART 340A and sending the pulsewidth-adjusted strobe signal to the UART 340A, thereby loading the 8-bit parallel data in the UART 340A, and a data output controlling unit 330 for controlling outputting of data to the side of the printer 200. The data output controlling unit 330 includes a flip-flop 330A adapted to be set by a busy signal and an acknowledge signal both outputted from the printer 200 and to be cleared by the strobe signal outputted from the side of the computer 100, and a pair of unistable multi-vibrators 330B and 330C respectively adapted to activate the busy signal and the acknowledge signal transmitted from the side of the printer 200. The transmitted and received data converting unit 340 which constitutes a part of the data receiver and transmitter unit 300 includes the UART 340A adapted to convert the 8-bit parallel data outputted from the parallel data input buffer 310 and then loaded in the multi-vibrator 320 into serial data to be sent to a differential encoder 340C and convert a serial data signal outputted from the printer 200 into a parallel data signal. As a part of the transmitted and received data converting unit 340, a clock generator 340B is also provided which is adapted to generate a transmitting clock and a receiving clock both to be used in the UART 340A. The differential encoder 340C which also constitutes a part of the transmitted and received data converting unit 340 serves to differentially encode the serial data signal from the UART 340A to be transmitted, so as to remove an error generated due to phase ambiguity upon applying the data to the receiver-side of the printer 200. The transmitted and received data converting unit 340 further includes a differential decoder 340D adapted to a signal despread in a receiver-side baseband processor 350C of a transmitted and received data processing unit 350 which also constitutes a part of the data receiver and transmitter unit 300. The transmitted and received data processing unit 350 includes a transmitter-side baseband processor 350A adapted to band-spread the differentially-encoded signal outputted from the differential encoder 340C of the transmitted and received data converting unit 340 by use of a corresponding one of pseudo noise codes respectively allocated to the computers 100 so as to allow the differentially-encoded signal to have a processing gain, and an intermediate frequency/radio frequency (IF/RF) processor 350B adapted to binary-phase-modulate/demodulate band-spread signals being transmitted and received and radio-frequency-process them so as to achieve wireless data transmission and receipt with respect to the printer 200. As a part of the transmitted and received data processing unit 350, the receiver-side baseband processor 350C is also provided. The receiver-side baseband processor 350C serves to despread the signal received from the side of the printer 200 via the IF/RF processor 350B by use of a matched filter C2 having a pseudo noise code identical to an intrinsic pseudo noise code of the transmitter-side of the printer 200.

As mentioned above, the data transmitter and receiver unit 300 having the above-mentioned construction is installed in the side of each computer 100.

Figure 3:
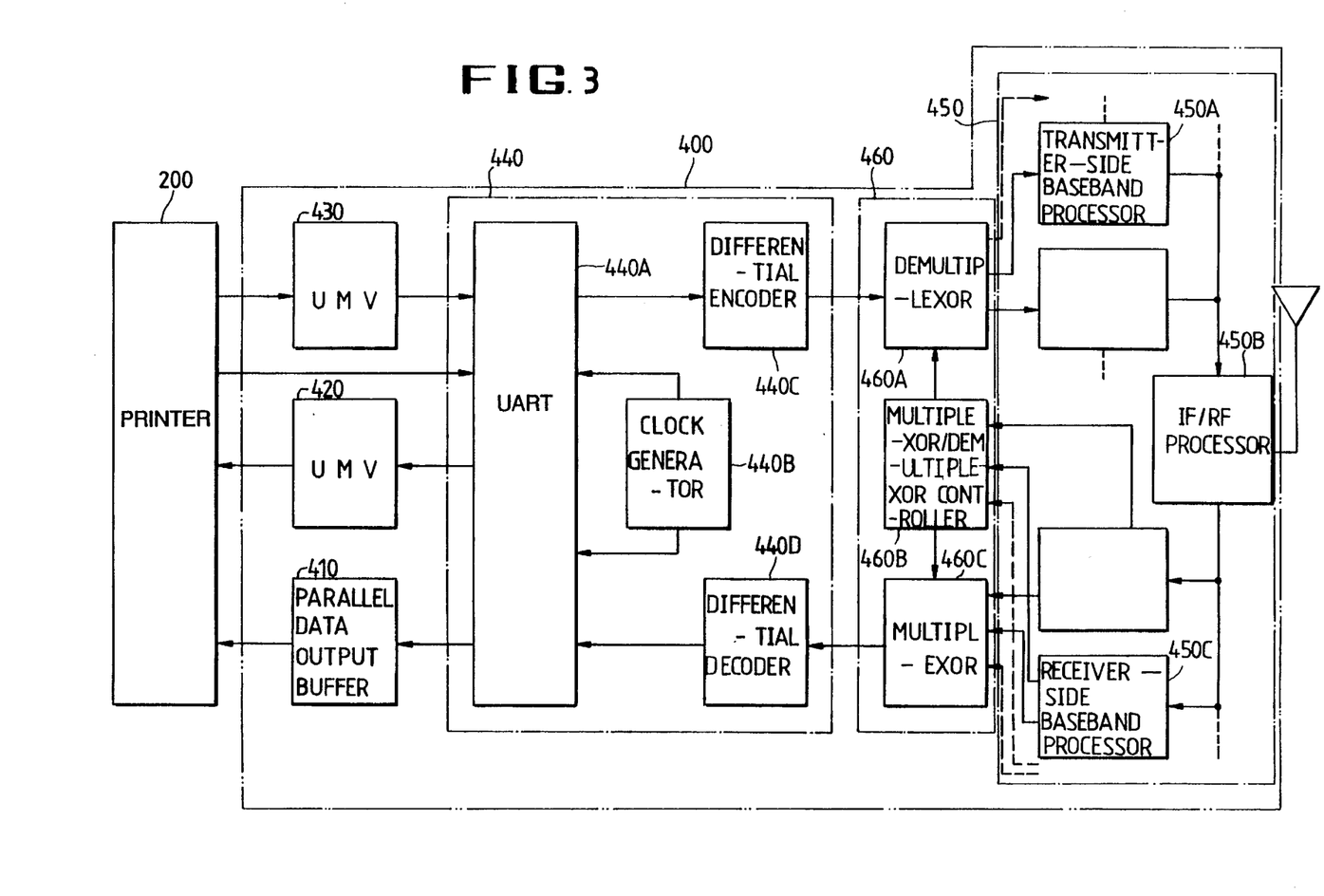
FIG. 3 is a block diagram illustrating a printer-side data receiver and transmitter unit constituting a part of the wireless printer common system in accordance with the present invention.

FIG. 3 is a block diagram illustrating another data receiver and transmitter unit constituting a part of the wireless printer common system in accordance with the present invention. This data receiver and transmitter unit is adapted to be mounted at the side of the printer 200 and denoted by the reference numeral 400. As shown in FIG. 3, the data receiver and transmitter unit 400 adapted to be mounted at the printer side includes a parallel data output buffer 410 for receiving 8-bit parallel data from the side of each computer 100 and sending it to the printer 200, a unistable multi-vibrator 420 for informing of effectiveness of the 8-bit data received from the side of each computer 100, and another unistable multi-vibrator 430 for adjusting the pulsewidth of the busy signal being inactive at a print enable state of the printer 200. The data receiver and transmitter unit 400 further includes a transmitted and received data converting unit 440 for not only converting the busy signal received from the printer side into a serial data signal and differentially decoding the serial data signal, but also converting serial data outputted from the side of each computer 100 into parallel data. The transmitted and received data converting unit 440 includes a UART 440A adapted to convert the pulsewidth-adjusted busy signal from the unistable multi-vibrator 430 into a serial data signal to be sent to a differential encoder 440C, and a clock generator 440B adapted to generate a transmitting clock and a receiving clock both to be used in the UART 440A. The differential encoder 440C which also constitutes a part of the transmitted and received data converting unit 440 serves to differentially encode the serial data signal from the UART 440A to be transmitted, so as to remove an error generated due to phase ambiguity upon applying the data to the computer's receiver-side. The transmitted and received data converting unit 440 further includes a differential decoder 440D adapted to differentially decode a signal from each of receiver-side baseband processors 450C of a transmitted and received data processing unit 450 selected in accordance with the priority sequence by a control signal of a multiplexor/demultiplexor controller 460B of a transmitted data controlling unit 460. Both the transmitted and received data processing unit 450 and the transmitted data controlling unit 460 also constitute a part of the data receiver and transmitter unit 400. The transmitted data controlling unit 460 includes a demultiplexor 460A adapted to send a differentially-encoded signal from the differential encoder 440C to a corresponding transmitter-side baseband processor 450A of the transmitted and received data processing unit 450, and a multiplexor 460C adapted to select one, in accordance with the priority sequence, from a plurality of signals generated by despreading the signal received to the printer side through the receiver-side baseband processors 450C of the transmitted and received data processing unit 450, and send the selected signal to the differential decoder 440D of the transmitted and received data converting unit 440. The multiplexor/demultiplexor controller 460B also constitutes a part of the transmitted data controlling unit 460. The multiplexor/demultiplexor controller 460B serves to control both the demultiplexor 460A and the multiplexor 460C. On the other hand, the transmitted and received data processing unit 450 includes a plurality of transmitter-side baseband processors 450A respectively corresponding to the computers 100 sharing the single printer 200 and having intrinsic pseudo noise codes allocated to the computers 100 for a code-divided multi-connection between the printer 200 and the computers 100. The transmitted and received data processing unit 450 further includes an IF/RF processor 450B adapted to binary-phase-modulate/demodulate the band-spread transmitted and received signals and radio-frequency-process them so as to achieve wireless data transmission and receipt with respect to the side of each computer 100. As a part of the transmitted and received data processing unit 450, the receiver-side baseband processors 450C are also provided. Each receiver-side baseband processor 450C serves to despread a composite signal from the side of each corresponding computer 100 via the IF/RF processor 450B by use of a matched filter CC2 (FIG. 5) having a pseudo noise code identical to the intrinsic pseudo noise code of the transmitter side of the corresponding computer 100.

As mentioned above, the data transmitter and receiver unit 400 having the above-mentioned construction is installed in the side of printer 200.

Figure 4:
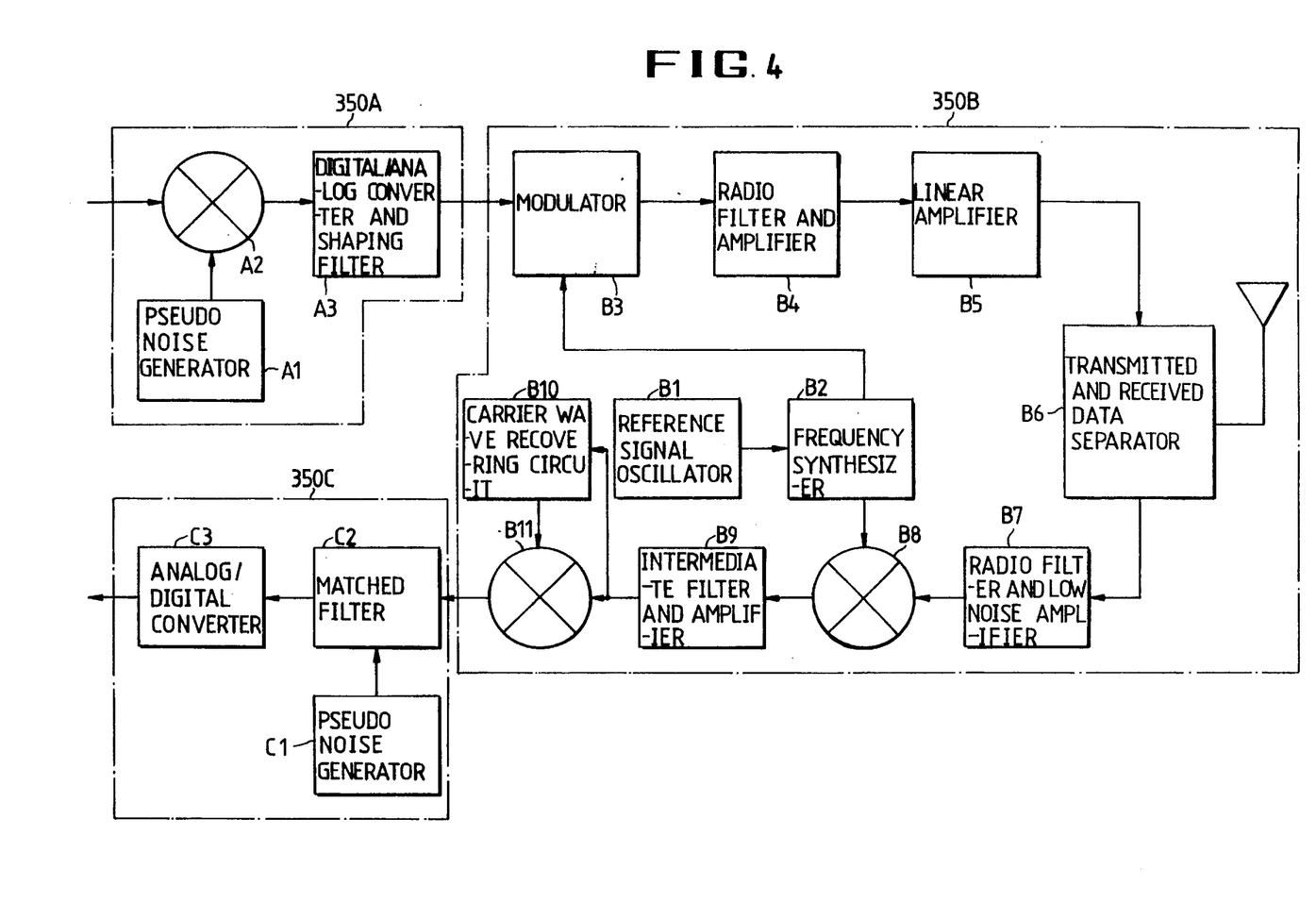
FIG. 4 is a block diagram illustrating a transmitted and received data processing unit of the computer-side data receiver and transmitter unit shown in FIG. 2.

FIG. 4 is a block diagram illustrating the transmitted and received data processing unit 350 shown in FIG. 2.

As shown in FIG. 4, the transmitter-side baseband processor 350A of the transmitted and received data processing unit 350 includes a pseudo noise generator A1 adapted to generate intrinsic pseudo noise codes respectively allocated to the computers 100 and send them to a mixer A2 which also constitutes a part of the transmitter-side baseband processor 350A. The mixer A2 serves to band-spread the differentially encoded signal from the differential encoder 340C of the transmitted and received data converting unit 340 in a direct sequence by use of the pseudo noise code received from the pseudo noise generator A1. The transmitter-side baseband processor 350A further includes a digital/analog converter and shaping filter A3 adapted to convert the band-spread signal from the mixer A2 into an analog signal and shape the waveform of the analog signal such that it is appropriately used as an input signal for a modulator B3 of the IF/RF processor 350B.

On the other hand, the IF/RF processor 350B of the transmitted and received data processing unit 350 includes a reference signal oscillator B1 adapted to generate a reference signal to be sent to a frequency synthesizer B2 which also constitutes a part of the IF/RF processor 350B. The modulator B3 which also constitutes a part of the IF/RF processor 350B serves to differentially encode and binary-phase-modulate a transmitted carrier wave signal synthesized in the frequency synthesizer B2 by a differentially-encoded and band-spread signal outputted from the transmitter-side baseband processor 350A. The IF/RF processor 350B further includes a radio filter and amplifier B4 adapted to remove an unnecessary component from an output signal from the modulator B3, namely, a differentially encoded and binary-phase-modulated signal and amplify the resultant signal, a linear amplifier B5 adapted to amplify an output signal from the radio filter and amplifier B4 again, a transmitted and received data separator B6 adapted to separate a signal transmitted from the side of the computers 100 and a signal received from the side of the printer 200 from each other, a radio filter and low noise amplifier B7 adapted to remove an unnecessary component from the radio frequency signal received from the side of the printer 200 via the transmitted and received data separator B6 and low noise amplify the resultant signal, a mixer B8 adapted to convert the radio frequency signal received from the radio filter and low noise amplifier B7 by use of a locally oscillating signal synthesized in the frequency synthesizer B2, an intermediate filter and amplifier B9 adapted to remove an unnecessary component from an output signal from the mixer B8 and amplify the resultant signal, a carrier wave recovering circuit B10 adapted to receive an output signal from the intermediate filter and amplifier B9 and recover a signal corresponding in frequency and phase to the received signal, and another mixer B11 adapted to multiply the recovered carrier wave signal from the carrier wave recovering circuit B10 and the output signal from the intermediate filter and amplifier B9 and thereby generate a demodulated signal to be sent to the matched filter C2 of the receiver-side baseband processor 350C.

On the other hand, the receiver-side baseband processor 350C includes a pseudo noise generator C1 adapted to generate a pseudo noise code identical to that of each printer's transmitter-side baseband processor 450A. The matched filter C2 also constitutes a part of the receiver-side baseband processor 350C. This matched filter C2 serves to rapidly and synchronously obtain the pseudo noise code generated from the pseudo noise generator C1 and despread the demodulated signal outputted from the IF/RF processor 350B. The receiver-side baseband processor 350C further includes an analog/digital converter C3 adapted to convert a despread signal from the matched filter C2 into a digital signal.

Figure 5:
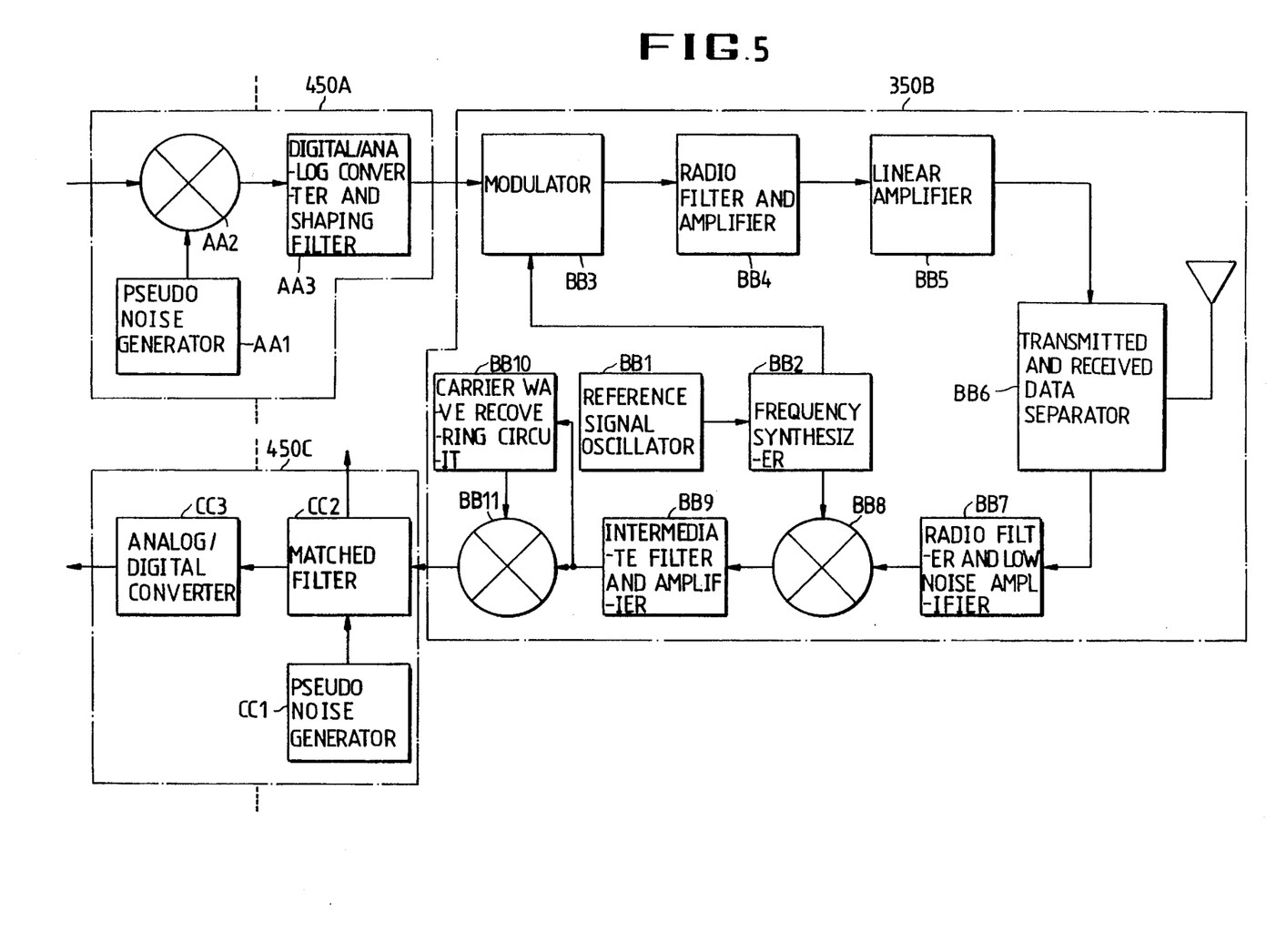
FIG. 5 is a block diagram illustrating a transmitted and received data processing unit of the printer-side data receiver and transmitter unit shown in FIG. 3.

FIG. 5 is a block diagram illustrating the transmitted and received data processing unit 450 shown in FIG. 3.

As shown in FIG. 5, each transmitter-side baseband processor 450A of the transmitted and received data processing unit 450, which serves to achieve the code-divided multi-connection between the printer 200 and the corresponding one of the computers 100 sharing the printer 200 and thereby the data transmission and receipt, includes a pseudo noise generator AA1 adapted to generate a code identical to each of the intrinsic pseudo noise codes allocated to respective receiver-side baseband processors 350C of the computers 100, and a mixer AA2 adapted to band-spread an output signal from the demultiplexor 460A of the transmitted and received data controlling unit 460 in a direct sequence by use of the pseudo noise code received from the pseudo noise generator AA1. The transmitter-side baseband processor 450A further includes a digital/analog converter and shaping filter AA3 adapted to convert the band-spread signal from the mixer AA2 into an analog signal and shape the waveform of the analog signal such that it is appropriately used as an input signal for a modulator BB3 of the IF/RF processor 450B.

On the other hand, the IF/RF processor 450B of the transmitted and received data processing unit 450 includes a reference signal oscillator BB1 adapted to generate a reference signal to be sent to a frequency synthesizer BB2 which also constitutes a part of the IF/RF processor 450B. The modulator BB3 which also constitutes a part of the IF/RF processor 450B serves to differentially encode and binary-phase-modulate a transmitted carrier wave signal synthesized in the frequency synthesizer BB2 by a differentially-encoded and band-spread signal outputted from the transmitter-side baseband processor 450A. The IF/RF processor 450B further includes a radio filter and amplifier BB4 adapted to remove an unnecessary component from an output signal from the modulator BB3, namely, a differentially encoded and binary-phase-modulated signal to have radio frequency, and amplify the resultant signal, a linear amplifier BB5 adapted to amplify an output signal from the radio filter and amplifier BB4 again, a transmitted and received data separator BB6 adapted to separate a signal transmitted from the side of the printer 200 and a signal received from the side of the computers 100 from each other, a radio filter and low noise amplifier BB7 adapted to remove an unnecessary component from the radio frequency signal received from the side of the computers 200 via the transmitted and received data separator BB6 and low noise amplify the resultant signal, a mixer BB8 adapted to convert the radio frequency signal received from the radio filter and low noise amplifier BB7 by use of a locally oscillating signal synthesized in the frequency synthesizer BB2, an intermediate filter and amplifier BB9 adapted to remove an unnecessary component from an output signal from the mixer BB8 and amplify the resultant signal, a carrier wave recovering circuit BB10 adapted to receive an output signal from the intermediate filter and amplifier BB9 and recover a signal corresponding in frequency and phase to the received signal, and another mixer BB11 adapted to multiply the recovered carrier wave signal from the carrier wave recovering circuit BB10 and the output signal from the intermediate filter and amplifier BB9 and thereby generate a demodulated signal to be sent to the matched filter CC2 of the receiver-side baseband processor 450C.

On the other hand, the receiver-side baseband processor 450C includes a pseudo noise generator CC1 adapted to generate a pseudo noise code identical to that of the transmitter-side baseband processor 350A for each of the computers 100 sharing the printer 200. The matched filter CC2 also constitutes a part of the receiver-side baseband processor 450C. This matched filter CC2 serves to rapidly and synchronously obtain the pseudo noise code generated from the pseudo noise generator CC1 and despread the demodulated signal outputted from the IF/RF processor 450B. The receiver-side baseband processor 450C further includes an analog/digital converter CC3 adapted to convert a despread signal from the matched filter CC2 into a digital signal.

Both the number of receiver-side baseband processors 450A and transmitter-side baseband processors 450C equipped in the side of the printer 200 correspond to the number of computers 100 sharing the printer 200.

Now, operation of the wireless printer common system having the above-mentioned construction in accordance with the present invention will be described.

When the data receiver and transmitter unit 300 at the side of one of the computers 100 acknowledges an inactive busy signal indicative of a print enable state of the printer 200, it sends 8-bit parallel data from the side of the computer 100 to be printed to the UART 340A of the transmitted and received data converting unit 340 via the parallel data input buffer 310. At this time, a strobe signal being activated for several microseconds is also generated from the side of the computer 100 and then applied to the unistable multi-vibrator 320 which, in turn, adjusts the pulsewidth of the strobe signal. The resultant strobe signal from the unistable multi-vibrator 320 is then applied to the UART 340A of the transmitted and received data converting unit 340. As a result, the 8-bit parallel data is loaded in the UART 340A. Upon receiving the strobe signal, the UART 340A converts the received parallel data into serial data and sends the serial data to the differential encoder 340C of the transmitted and received data converting unit 340. The pulsewidth-adjusted strobe signal from the unistable multi-vibrator 320 is also applied to the flip-flop 330A of the data output controlling unit 330. The flip-flop 330A which has been at its set state is cleared by the received strobe signal. The flip-flop 330A then makes the busy signal inputted to the side of the computer 100 active. As a result, any subsequent data outputting from the side of the computer 100 is cut off.

On the other hand, the serial data signal outputted from the UART 340A is received in the differential encoder 340C which, in turn, encodes differentially the received serial data so as to remove an error generated due to phase ambiguity occurring at the receiver-side of the printer 200 and thereby obtain a good bit error rate. The resultant differentially-encoded signal from the differential encoder 340C is then sent to the transmitter-side baseband processor 350A of the transmitted and received data processing unit 350. The differentially-encoded signal received in the transmitter-side baseband processor 350A is first applied to the mixer A2 which also receives an intrinsic pseudo noise code signal generated from the pseudo noise generator A1 and allocated to each corresponding computer 100. In the mixer A2, the differentially-encoded signal is spread in a direct sequence while getting a processing gain by the intrinsic pseudo noise code signal. The resultant band-spread signal from the mixer A2 is applied to the digital/analog converter and shaping filter A3 which, in turn, converts the received signal into an analog signal and shapes the waveform of the analog signal. The resultant signal from the digital/analog converter and shaping filter A3 is then sent to the IF/RF processor 350B. The signal received in the IF/RF processor 350B is first applied to the modulator B3 which also receives a transmitted carrier wave signal synthesized in the frequency synthesizer B2 by use of a reference signal generated from the reference signal oscillator B1. By the signal from the transmitter-side baseband processor 350A, the transmitted carrier wave signal is differentially encoded and binary-phase-modulated in the modulator B3. The resultant signal from the modulator B3 is sent to the radio filter and amplifier B4 which, in turn, filters the received signal to have only a radio frequency component and amplifies the filtered signal. The amplified signal from the radio filter and amplifier B4 is then amplified in the linear amplifier B5 again. The resultant transmitted radio frequency signal from the linear amplifier B5 is then sent to the transmitted and received data separator B6 which, in turn, transmits the received signal to the side of the printer 200 via an antenna.

The radio frequency signal transmitted from the side of the computer 100 to the side of the printer 200 is applied to the transmitted and received data processing unit 450 of the data transmitter and receiver unit 400 installed in the side of printer 200 via an antenna equipped in the printer 200. The radio frequency signal received in the transmitted and received data processing unit 450 is first applied to the transmitted and received data processor 450B, in particular, a receiving port of the transmitted and received data separator BB6 of the transmitted and received data processor 450B. The radio frequency signal applied to the transmitted and received data separator BB6 is sent to the radio filter and low noise amplifier BB7 which, in turn, low noise filters the received signal. The resultant signal from the radio filter and low noise amplifier BB7 is multiplied by a locally oscillating signal generated from the frequency synthesizer BB2 in the mixer BB8. As a result, the radio frequency signal is converted into an intermediate frequency signal. This intermediate frequency signal is amplified by the intermediate filter and amplifier BB9 and then transmitted to both the carrier wave recovering circuit BB10 and the mixer BB11. In the mixer BB11, the intermediate frequency signal is multiplied by a carrier wave signal recovered in the carrier wave recovering circuit BB10. The resultant signal from the mixer BB11 is sent to a corresponding one of the receiver-side baseband processors 450C.

The signal received in the printer's receiver-side baseband processor 450C is despread by the matched filter CC2 of the receiver-side baseband processor 450C which includes the pseudo noise generator CC1 generating a pseudo noise code identical to the intrinsic pseudo noise code of the transmitter-side baseband processor 350A of the corresponding computer 100. The despread signal from the matched filter CC2 is then sent to the analog/digital converter CC3 which, in turn, converts the received signal into a digital signal. This digital signal from the analog/digital converter CC3 is applied to the multiplexor 460C of the transmitted and received data controlling unit 460. At this time, the mixed filter CC2 generates a code synchronization detecting signal and sends it to the multiplexor/demultiplexor controller 460B of the transmitted data controlling unit 460. By the code synchronization detecting signal, the multiplexor/demultiplexor controller 460B Generates control signals respectively for controlling the demultiplexor 460A and the multiplexor 460C.

Upon receiving the multiplexor control signal from the multiplexor/demultiplexor controller 460B, the multiplexor 460C is controlled to send the signal from the receiver-side baseband processor 450C selected in accordance with the priority sequence to the differential decoder 440D of the transmitted and received data converting unit 440, so as to differentially decode the signal. On the other hand, the demultiplexor 460A is controlled by the demultiplexor control signal from the multiplexor/demultiplexor controller 460B to send the active busy signal received from the UART 440A to the transmitter-side baseband processors 450A respectively corresponding to the remaining computers 100 establishing no communication link. The active busy signal received in each transmitter-side baseband processor 450A is band-spread by the intrinsic code allocated to the transmitter-side baseband processor 450A and then sent to the side of the computers 100, thereby causing the computers 100 to be at the standby state.

The signal, namely, the serial data signal from the receiver-side baseband processor 450C received in the differential decoder 440D via the multiplexor 460C is differentially decoded and then sent to a serial input terminal of the UART 440A of the transmitted and received data converting unit 440. In the UART 440A, the serial data signal is converted into a parallel data signal which is, in turn, sent to the printer 200 via the parallel data output buffer 410. Simultaneously, the unistable multi-vibrator 420 applies a strobe signal informing of effectiveness of the data received from the side of the corresponding computer 100 to the printer 200. Upon receiving the signals, the printer 200 prints the received data and sends an acknowledge signal to the UART 440A, thereby enabling the UART 440A to be at a standby state for subsequent data. Also, the unistable multi-vibrator 430 adjusts the pulsewidth of the busy signal being inactive and sends the resultant signal to the UART 440A to inform the side of the computers 100 of the print enable state for subsequent data.

The inactive busy signal received in the UART 440A via the unistable multi-vibrator 430 at the print enable state of the printer 200 as mentioned above is converted into a serial signal by the UART 440A. The serial data signal from the UART 440A is sent to the differential encoder 440C of the transmitted and received data converting unit 440. The serial data signal received in the differential encoder 440C is differentially encoded by the differential encoder 440C so as to remove an error generated due to phase ambiguity occurring at the receiver-side of the computers 200 therefrom and thereby obtain a good bit error rate. The resultant signal from the differential encoder 440C is then sent to the corresponding transmitter-side baseband processor 450A of the transmitted and received data processing unit 450 under the control of the demultiplexor 460A controlled by the demultiplexor control signal from the multiplexor/demultiplexor controller 460B. The differentially-encoded signal received in the transmitter-side baseband processor 450A is first applied to the mixer AA2 which also receives an intrinsic pseudo noise code signal generated from the pseudo noise generator AA1. In the mixer AA2, the differentially-encoded signal is spread in a direct sequence by the intrinsic pseudo noise code signal.

At this time, each of the remaining printer's transmitter-side baseband processors 450A establishing no logical connection with the demultiplexor 460A band-spreads the active busy signal by its corresponding intrinsic code and sends it to the side of the corresponding computer 100, thereby enabling the computer to be at the standby state.

The resultant band-spread signal from the mixer AA2 of the transmitter-side baseband processor 450A establishing a logical connection with the demultiplexor 460A is applied to the digital/analog converter and shaping filter AA3 and then to the IF/RF processor 450B of the transmitted and received data processing unit 450. The signal received in the IF/RF processor 450B is first applied to the modulator BB3 which also receives a transmitted carrier wave signal synthesized in the frequency synthesizer BB2 by use of a reference signal generated from the reference signal oscillator BB1. By the signal from the transmitter-side baseband processor 450A, the transmitted carrier wave signal is differentially encoded and binary-phase-modulated in the modulator BB3. The resultant signal from the modulator BB3 is sent to the radio filter and amplifier BB4 which, in turn, filters the received signal to remove an unnecessary component from the signal and amplifies the filtered signal. The amplified signal from the radio filter and amplifier BB4 is then amplified in the linear amplifier BB5 again. The resultant transmitted radio frequency signal from the linear amplifier BB5 is then sent to the transmitted and received data separator BB6 which, in turn, transmits the received signal to the side of the corresponding computer 100 via the antenna.

The radio frequency signal, including the busy signal and the acknowledge signal, transmitted from the side of the printer 200 to the side of the corresponding computer 100 is applied to the transmitted and received data processing unit 350 of the data transmitter and receiver unit 300 installed in the side of the computer 100 via the antenna equipped in the computer 100. The radio frequency signal received in the transmitted and received data processing unit 350 is first applied to the transmitted and received data processor 350B, in particular, a receiving port of the transmitted and received data separator B6 of the transmitted and received data processor 350B. The radio frequency signal applied to the transmitted and received data separator B6 is sent to the radio filter and low noise amplifier B7 which, in turn, filters and low noise amplifies the received signal. The resultant signal from the radio filter and low noise amplifier B7 is multiplied by a locally oscillating signal generated from the frequency synthesizer B2 in the mixer B8. As a result, the radio frequency signal is converted into an intermediate frequency signal. This intermediate frequency signal is amplified by the intermediate filter and amplifier B9 and then transmitted to both the carrier wave recovering circuit B10 and the mixer B11. In the mixer B11, the intermediate frequency signal is multiplied by a carrier wave signal recovered in the carrier wave recovering circuit B10. The resultant signal from the mixer B11 is sent to the receiver-side baseband processor 350C.

The signal received in the printer's receiver-side baseband processor 450C is despread by the matched filter C2 of the receiver-side baseband processor 350C which includes the pseudo noise generator C1 generating a pseudo noise code identical to one, used by the demultiplexor control signal, of the pseudo noise codes of the transmitter-side baseband processor 450A at the side of the printer 200. The despread signal from the matched filter C2 is then sent to the analog/digital converter C3 which, in turn, converts the received signal into a digital signal. This digital signal from the analog/digital converter C3 is applied to the differential decoder 340D of the transmitted and received data converting unit 340 which, in turn, decodes differentially the received signal. The resultant signal, namely, the serial data signal from the differential decoder 340D is applied to a serial input port of the UART 340A and then converted into a parallel data signal in the UART 340A. The parallel data signal from the UART 340A is then sent to the data output controlling unit 330. By the received signal, the flip-flop 330A of the data output controlling unit 330 is preset. Thereafter, the unistable multi-vibrators 330B and 330C process an output signal from the flip-flop 330A so that the busy signal can be inactive several microseconds after the acknowledge signal becomes active, thereby enabling the corresponding computer 100 to send subsequent data to the UART 340A of the transmitted and received data converting unit 340.

By repeating the above procedures, the computers 100 transmit data to be printed in the unit of one byte while the printer 200 prints the data transmitted from the highest priority computer 100.

As apparent from the above description, the wireless common printer system in accordance with the present invention can provide a superior communication quality and a high reliability in general office circumstances exposed to strong noise of electric appliances, because it utilizes the spread spectrum communication system for the code-divided multi-connection. The common printer system also eliminates requirements of a separate printer switching unit and a printer cable. Since the common printer system of the present invention is the wireless system, there is no limitation on the usable distance in so far as electric power of a certain radio frequency is kept. By virtue of this feature, the common printer system of the present invention can provide an enhanced convenience when it is applied to lap top computers and personal note book computers having a high movability.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless printer common system for enabling several personal computers to share a single printer, comprising first data transmitting and receiving means provided at each of the computers and adapted to transmit data to be printed to the printer by wireless communication and receive a signal from the printer by wireless communication; and second data transmitting and receiving means provided at the printer and adapted to simultaneously receive signals respectively transmitted from the computers, select one from the simultaneously received signals in accordance with a priority sequence, print the selected signal, and transmit a standby signal to the remaining computers, whose signals have not been printed yet, so that the remaining computers are at a standby state, whereby all the computers can achieve a code-divided multi-connection with the printer, wherein both the first and second data transmitting and receiving means employ spread spectrum modulation techniques to perform the transmit and receive functions, whereby the data is respectively spread and despread.

2. A wireless printer common system in accordance with claim 1, wherein the first data transmitting and receiving means comprises:

a parallel data input buffer for sending 8-bit parallel data to be printed to a transmitted and received data converting unit;

a unistable multi-vibrator for adjusting pulsewidth of a strobe signal being activated for several microseconds when the 8-bit parallel data is sent to the transmitted and received data converting unit and sending the pulsewidth-adjusted strobe signal to the transmitted and received data converting unit, thereby loading the 8-bit parallel data in the transmitted and received data converting unit;

a data output controlling unit for controlling outputting of data to the printer;

the transmitted and received data converting unit for converting the 8-bit parallel data received from the parallel data input buffer into serial data, differentially encoding the serial data, differentially decoding a serial data signal transmitted from the printer, and converting the differentially decoded serial data signal into a parallel data signal; and a transmitted and received data processing unit including a transmitter-side baseband processor adapted to generate a pseudo noise code allocated to the corresponding computer when the differentially-encoded signal received from the computer side is transmitted to the printer and band-spread the differentially-encoded signal by use of the generated pseudo noise code, an intermediate frequency/radio frequency processor adapted to process the signal transmitted from the computer side and the signal received from the printer side, and a receiver-side baseband processor adapted to despread the signal received from the printer side.

3. A wireless printer common system in accordance with claim 1, wherein the second data transmitting and receiving means comprises:

a parallel data output buffer for receiving 8-bit parallel data from the side of each of the computer and sending it to the printer;

a first unistable multi-vibrator for receiving a strobe signal transmitted from one of the computers and allowing the printer to be at a print enable state in response to the strobe signal;

a second unistable multi-vibrator for adjusting pulsewidth of a busy signal being inactive at the print enable state of the printer, the busy signal being transmitted from the printer;

a transmitted and received data converting unit for not only converting the busy signal received from the printer side into a serial data signal and differentially decoding the serial data signal, but also converting the serial data transmitted from the side of the computer into parallel data;

a transmitted data controlling unit for controlling data transmitted to the printer side and data received from the printer side to process them in accordance with a priority sequence; and a transmitted and received data processing unit for not only band-spreading the data processed in the transmitted and received data controlling unit and sending it to the computer side, but also despreading the data received from the computer side and sending it to the transmitted and received data controlling unit, the transmitted and received data processing unit including a plurality of transmitter-side baseband processors respectively corresponding to the computers, each of the transmitter-side base band processors being adapted to generate a pseudo noise code allocated to each corresponding computer when the differentially-encoded signal received from the printer side is transmitted to the computer side and band-spread the differentially-encoded signal by use of the generated pseudo noise code, an intermediate frequency/radio frequency processor adapted to process the signal transmitted from the printer side and the signal received from the computer side, and a plurality of receiver-side baseband processors respectively corresponding to the computers, each of the receiver-side base band processors being adapted to despread the signal received from the computer side.

4. A wireless printer common system in accordance with claim 2 or claim 3, wherein each intermediate frequency/radio frequency processor of the transmitted and received data processing units of the first and second data transmitting and receiving means includes a modulator adapted to modulate phase of the differentially encoded signal so as to remove an error generated due to phase ambiguity occurring at the printer's or computer's receiver side and thereby obtain a good bit error rate.

5. A wireless printer common system in accordance with claim 2 or claim 3, wherein each transmitter-side baseband processor of the transmitted and received data processing units of the first and second data transmitting and receiving means utilizes a direct sequence spread as a band spread for the code-divided multi-connection, the direct sequence spread being well matched with a binary phase modulation for a differential encoding.

6. A wireless printer common system in accordance with claim 2 or claim 3, wherein each receiver-side baseband processor of the transmitted and received data processing units of the first and second data transmitting and receiving means includes a matched filter for obtaining a rapid synchronization of the corresponding pseudo noise code.

7. A wireless printer common system in accordance with claim 2, wherein the data output controlling unit comprises a flip-flop adapted to be switched between a set state and a preset state by a busy signal and an acknowledge signal both transmitted from the printer side, and a pair of unistable multi-vibrators respectively adapted to adjust pulsewidths of the signals transmitted from the printer side and send the pulsewidth-adjusted signals to the computer side, the flip-flop being switched from the set state obtained by the signals transmitted from the printer to a clear state by the pulse-width-adjusted strobe signal from the unistable multi-vibrator of the computer-side, thereby enabling the busy signal to be active, so that after outputting of one byte data from the computer side, outputting of subsequent data is cut off until the flip-flop is switched to the preset state.

8. A wireless printer common system in accordance with claim 3, wherein the transmitted and received data controlling unit comprises a multiplexor adapted to send one selected from a plurality of signals generated from the receiver-side baseband processors of the transmitted and received data processing unit to a differential decoder, a demultiplexor adapted to send a signal transmitted from the printer to a corresponding one of the transmitter-side baseband processors of the transmitted and received data processing unit, and a multiplexor/demultiplexor controller adapted to control both the demultiplexor and the multiplexor, the multiplexor/demultiplexor controller serving to transmit a standby signal to the remaining transmitter-side baseband processors establishing no logic connection with the demultiplexor by use of code synchronization detect signals respectively generated from the receiver-side baseband processors, thereby causing the corresponding computers to be at a standby state of data transmission to the printer, whereby the signals from the receiver-side baseband processors can be selected in accordance with a priority sequence.

* * * * *